United States Patent
Moriya

(10) Patent No.: US 8,285,013 B2
(45) Date of Patent: Oct. 9, 2012

(54) METHOD AND APPARATUS FOR DETECTING ABNORMAL PATTERNS WITHIN DIAGNOSIS TARGET IMAGE UTILIZING THE PAST POSITIONS OF ABNORMAL PATTERNS

(75) Inventor: Yoshiyuki Moriya, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 1164 days.

(21) Appl. No.: 12/042,465

(22) Filed: Mar. 5, 2008

(65) Prior Publication Data

US 2008/0226145 A1 Sep. 18, 2008

(30) Foreign Application Priority Data

Mar. 5, 2007 (JP) .................................. 2007/054010

(51) Int. Cl.
*G06K 9/00* (2006.01)
(52) U.S. Cl. ..................................................... 382/128
(58) Field of Classification Search .................. 382/130, 382/131, 132, 294
See application file for complete search history.

(56) References Cited

U.S. PATENT DOCUMENTS

| | | | | |
|---|---|---|---|---|
| 6,738,063 | B2 * | 5/2004 | Shen et al. ..................... | 345/424 |
| 6,738,499 | B1 | 5/2004 | Doi et al. | |
| 7,162,066 | B2 * | 1/2007 | Oosawa ........................ | 382/132 |
| 7,492,931 | B2 * | 2/2009 | Sabol et al. .................... | 382/128 |
| 7,657,101 | B2 * | 2/2010 | Christiansen et al. ........ | 382/218 |
| 2003/0016850 | A1 * | 1/2003 | Kaufman et al. ............. | 382/128 |
| 2005/0002548 | A1 * | 1/2005 | Novak et al. .................. | 382/128 |
| 2005/0113651 | A1 * | 5/2005 | Wood et al. .................... | 600/300 |
| 2005/0238218 | A1 * | 10/2005 | Nakamura ..................... | 382/128 |
| 2007/0036410 | A1 * | 2/2007 | Ida et al. ........................ | 382/128 |
| 2008/0118134 | A1 * | 5/2008 | Sirohey et al. ................ | 382/131 |

FOREIGN PATENT DOCUMENTS

| | | |
|---|---|---|
| JP | 4129538 A | 4/1992 |
| JP | 08-131403 A | 5/1996 |
| JP | 08-294485 A | 11/1996 |
| JP | 10-137231 A | 5/1998 |
| JP | 2000-185036 A | 7/2000 |
| JP | 2005-124895 A | 5/2005 |
| JP | 2005224429 A | 8/2005 |

OTHER PUBLICATIONS

Usuda, K.; Saito, Y.; Sagawa, M.; Sato, M.; Kanma, K.; Takahashi, S.; Endo, C.; Chen, Y.; Sakurada, A.; Fujimura, S., "Tumor Doubling Time and Prognostic Assessment of Patients with Primary Lung Cancer," Oct. 15, 1994, Cancer, vol. 74, Issue 8, pp. 2239-2244.*

(Continued)

*Primary Examiner* — Vikkram Bali
(74) *Attorney, Agent, or Firm* — Sughrue Mion, PLLC

(57) ABSTRACT

An image processing apparatus having improved detection performance for detecting an abnormal shadow, such as a tumor, and reducing a burden on the user is disclosed. In the image processing apparatus, an aligning unit aligns a previous image and a current diagnosis image with each other, and a corresponding position calculating unit calculates a position on a subject in the current diagnosis image corresponding to the position of an abnormal shadow on the subject in the previous image based on positional information of the abnormal shadow on the subject in the previous image and alignment information. A current diagnosis image abnormal shadow detecting unit detects the abnormal shadow in the current diagnosis image from the vicinity of the corresponding position in the current diagnosis image.

4 Claims, 14 Drawing Sheets

OTHER PUBLICATIONS

Kazunori Okada et al., Robust Anisotropic Gaussian Fitting for Volumetric Characterization of Pulmonary Nodules in Multislice CT, IEEE Transactions on Medical Imaging, 2005, pp. 409-423, vol. 24, No. 3.

Hayashi, T., et al., "Classification of Lung Lobes Based on Bronchus from Chest Multi-slice CT Images," Journal of Institute of Electronics, Information and Communication Engineers D-II, vol. J87-D-II, No. 1, pp. 357-360, 2004.

Takatoshi Aoki, et al., "Evolution of Peripheral Lung Adenocarcinomas: CT Findings Correlated with Histology and Tumor Doubling Time", American Journal of Roentgenology, Mar. 2000, 174, pp. 763-768 Unites States, American Roentgen Ray Society.

Haruhiro Saito, et al., "The Initial Appearance of Lung Adenocarcinoma on Computed Tomography", Japanese Journal of Lung Cancer, Oct. 20, 2002, 42(6), pp. 573-581, Japan, The Japan Lung Cancer Society.

Japanese Office Action corresponding to Japanese Patent Application No. 2007-054010 dated Mar. 30, 2010.

JP Decision of Rejection, dated Jun. 29, 2010, issued in corresponding JP Application No. 2007-054010, 2 pages with partial English translation.

* cited by examiner

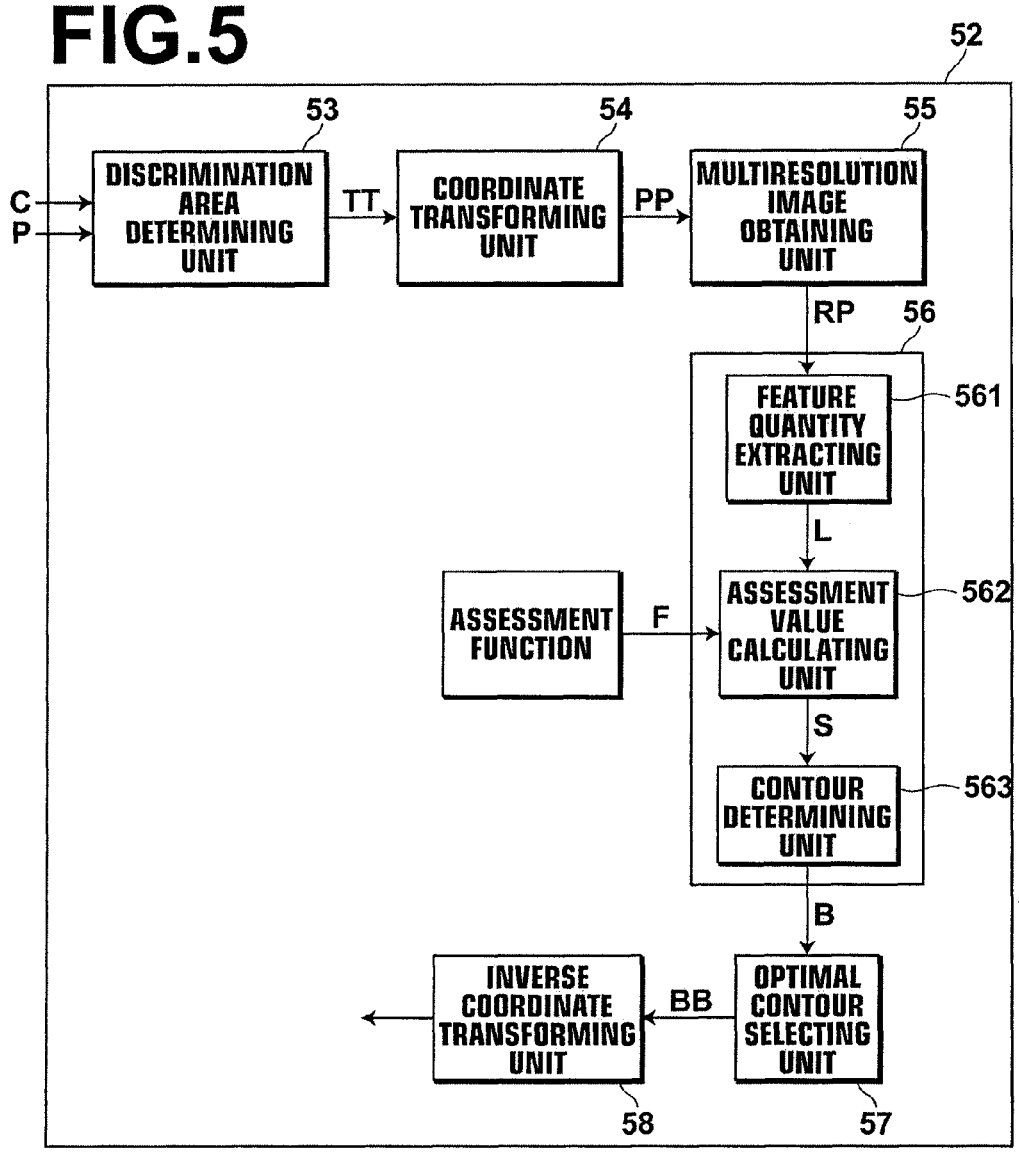
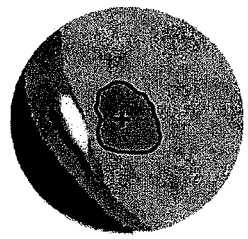

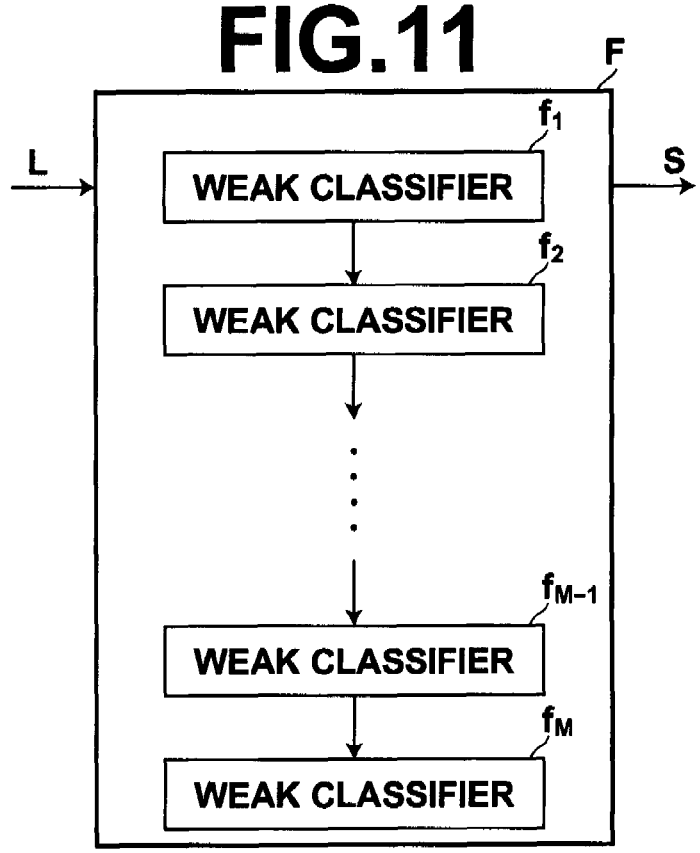
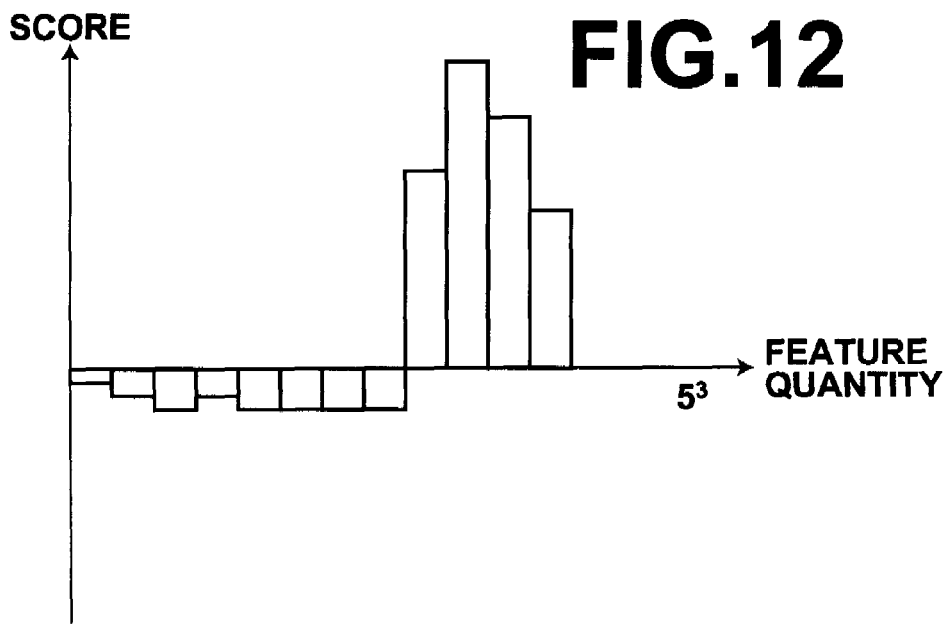

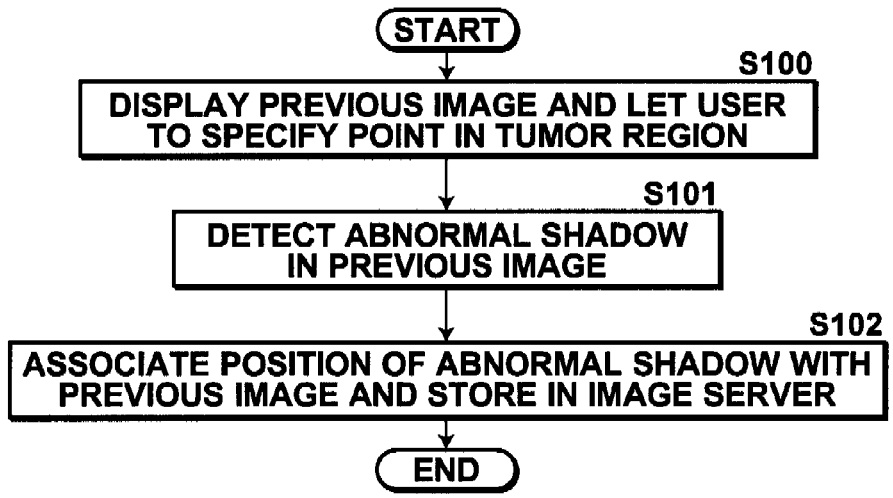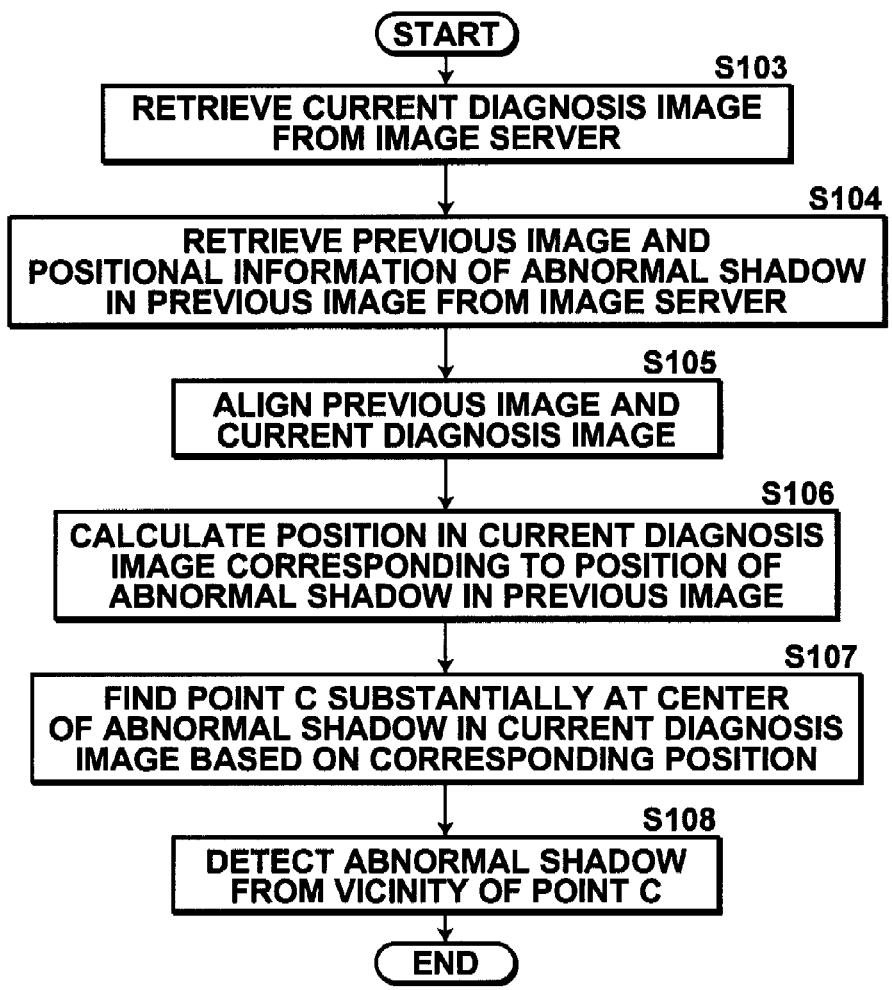

METHOD AND APPARATUS FOR DETECTING ABNORMAL PATTERNS WITHIN DIAGNOSIS TARGET IMAGE UTILIZING THE PAST POSITIONS OF ABNORMAL PATTERNS

BACKGROUND OF THE INVENTION

1. Field of the Invention

The present invention relates to an image processing apparatus and a computer readable media containing an image processing program for detecting an abnormal shadow in a medical image.

2. Description of the Related Art

In recent years, computer aided diagnosis (CAD) has been used in the medical field. In the CAD, a digital medical image (hereinafter simply referred to as a medical image) is analyzed for diagnosis through the use of a computer to reduce burden on a person who interprets the image, such as a doctor, during imaging diagnosis and to improve accuracy of diagnosis.

A known CAD scheme involves, for example, automatically analyzing malignancy of a tumor based on image information of the size of a lesion, and the like, in the medical image. It is necessary for medical diagnosis that a tumor region or a contour of the tumor region is accurately detected from a CT image, or the like, based on image information of a site where such a tumor is present.

U.S. Pat. No. 6,738,499 has proposed a method in which the contour of a tumor is manually set by an expert such as a radiologist, and likelihood of malignancy is automatically analyzed through an artificial neural network (ANN) technique based on feature quantities of the tumor obtained from the contour, such as the size of the tumor and a CT value distribution within the tumor.

As a highly robust method for detecting a tumor, a method has been proposed in K. Okada et al., "Robust Anisotropic Gaussian Fitting for Volumetric Characterization of Pulmonary Nodules in Multislice CT", IEEE Trans. Medical Imaging, Vol. 24, No. 3, pp. 409-423, 2005. In this method, it is supposed that a tumor region has a Gaussian luminance distribution, and the mean and variance estimates of anisotropic Gaussian are calculated to find a Gaussian distribution that fits the best to the luminance distribution of the tumor region, to obtained an elliptic contour having the position of the median of the Gaussian distribution as the center. In this method, the user specifies a point in the tumor region, and an area around the point is searched with gradually changing the position of the point to find an optimal contour having a luminance distribution similar to the Gaussian distribution.

However, both of the above methods require the user to specify an approximate position of the tumor. Since the same tumor of the same subject often appears at the same position in medical images of the subject taken at different times for observing changes of the tumor over time, it is troublesome for the user to specify the position of the tumor every time.

SUMMARY OF THE INVENTION

In view of the above-described circumstances, the present invention is directed to provide an image processing apparatus and a computer readable media containing an image processing program that reduce the burden on the user and improve performance of detection of an abnormal shadow, such as a tumor.

One aspect of the present invention is an image processing apparatus including: previous image storing means for storing a previous image containing an abnormal shadow obtained by photographing a subject; current diagnosis image storing means for storing a current diagnosis image to be diagnosed obtained by photographing the subject at a time later than the photographing time of the previous image; aligning means for aligning the positions of the subject contained in the previous image and the current diagnosis image; alignment information storing means for storing alignment information obtained by the aligning means; abnormal shadow positional information storing means for storing positional information of the abnormal shadow on the subject in the previous image; corresponding position calculating means for calculating, based on the positional information of the abnormal shadow and the alignment information, a corresponding position on the subject in the current diagnosis image, the corresponding position corresponding to the position of the abnormal shadow on the subject in the previous image; and current diagnosis image abnormal shadow detecting means for detecting an abnormal shadow in the current diagnosis image from the vicinity of the corresponding position in the current diagnosis image.

Another aspect of the invention is a computer readable media containing a program for causing a computer to function as: previous image storing means for storing a previous image containing an abnormal shadow obtained by photographing a subject; current diagnosis image storing means for storing a current diagnosis image to be diagnosed obtained by photographing the subject at a time later than the photographing time of the previous image; aligning means for aligning the positions of the subject contained in the previous image and the current diagnosis image; alignment information storing means for storing alignment information obtained by the aligning means; abnormal shadow positional information storing means for storing positional information of the abnormal shadow on the subject in the previous image; corresponding position calculating means for calculating, based on the positional information of the abnormal shadow and the alignment information, a corresponding position on the subject in the current diagnosis image, the corresponding position corresponding to the position of the abnormal shadow on the subject in the previous image; and current diagnosis image abnormal shadow detecting means for detecting an abnormal shadow in the current diagnosis image from the vicinity of the corresponding position in the current diagnosis image.

The "abnormal shadow" herein refers to a shadow in an image obtained by photographing a tissue such as a tumor, which is different from normal tissues, and includes a shadow which is not apparently an abnormal shadow but is likely to be an abnormal shadow.

The image processing apparatus of the invention may further include time calculating means for calculating a time over which the size of the abnormal shadow has changed from the size thereof in the previous image to a predefined size, based on the size of the abnormal shadow in the previous image, the size of the abnormal shadow detected in the current diagnosis image, and an interval between the photographing time of the previous image and the photographing time of the current diagnosis image.

The image processing apparatus of the invention may further include change displaying means for displaying size change information indicating whether the size of the abnormal shadow has increased or decreased, based on the size of the abnormal shadow in the previous image and the size of the abnormal shadow detected in the current diagnosis image.

BRIEF DESCRIPTION OF THE DRAWINGS

FIG. 5 is a diagram illustrating the schematic configuration of a region detecting unit, FIG. 6 is a diagram illustrating a region of an abnormal shadow (tumor region) with a specified starting position for detection, FIG. 11 illustrates one example of the configuration of an assessment function, FIG. 12 illustrates one example of a histogram used by a weak classifier, FIG. 14 is a flow chart illustrating the flow of a process carried out in the image processing apparatus of the first embodiment for detecting an abnormal shadow in a current diagnosis image based on the position of the abnormal shadow detected in the previous image (first part), FIG. 15 is a flow chart illustrating the flow of the process carried out in the image processing apparatus of the first embodiment for detecting the abnormal shadow in the current diagnosis image based on the position of the abnormal shadow detected in the previous image (second part)

DESCRIPTION OF THE PREFERRED EMBODIMENTS

Hereinafter, embodiments of the present invention will be described with reference to the drawings.

Figure 1:
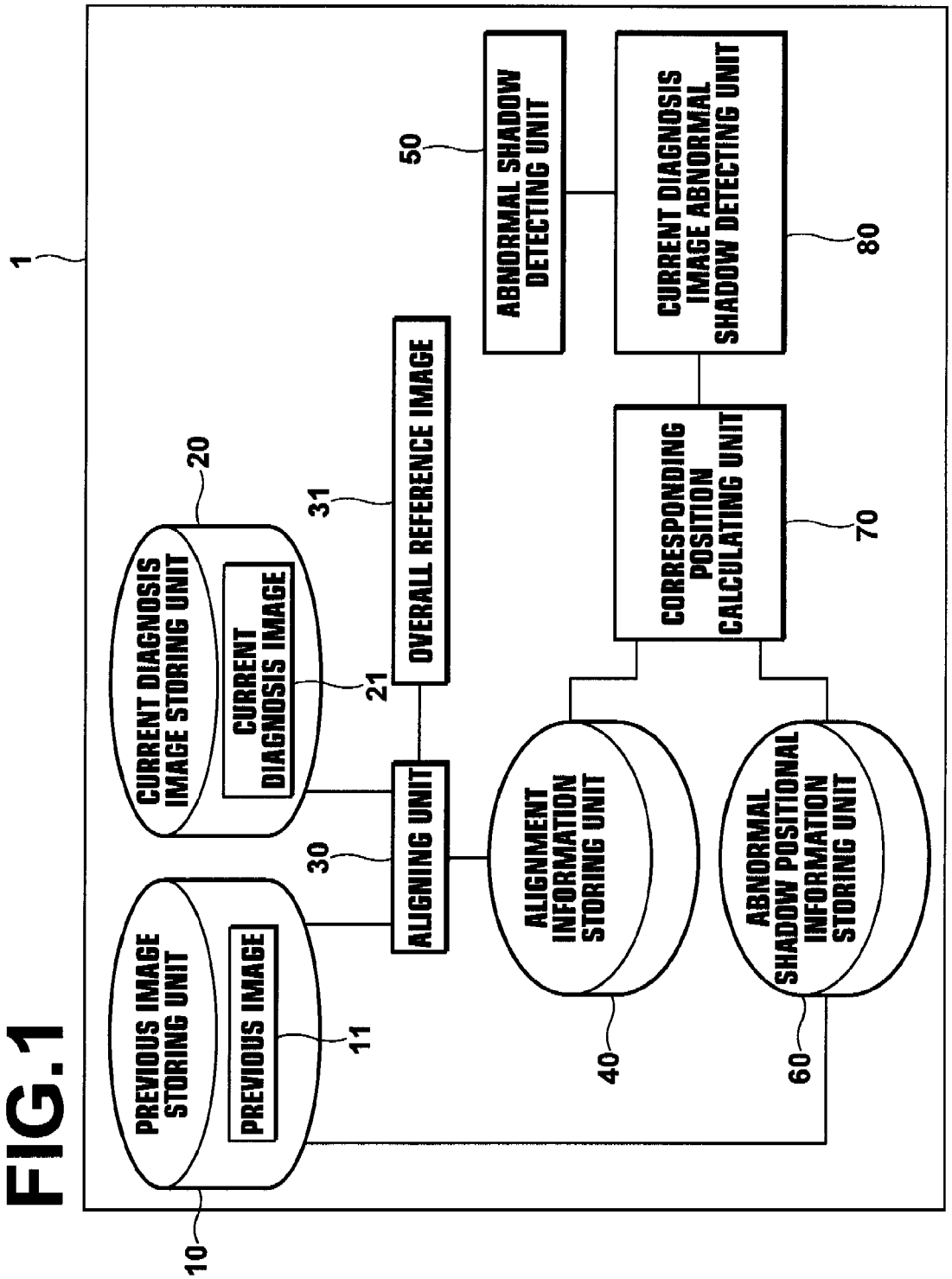
FIG. 1 is a diagram illustrating the schematic configuration of an image processing apparatus according to a first embodiment.

FIG. 1 illustrates the configuration of an image processing apparatus 1 of a first embodiment of the invention. It should be noted that the configuration of the image processing apparatus 1, as shown in FIG. 1, is implemented on a computer (such as a workstation), which loads an image processing program in an auxiliary storage device thereof and executes the program. The image processing program to be installed on the computer may be stored on an information storage medium such as a CD-ROM, or may be distributed via a network such as the Internet.

The image processing apparatus 1 includes: a previous image storing unit 10 for storing a previous image 11 containing an abnormal shadow obtained by previously photographing a subject; a current diagnosis image storing unit 20 for storing a current diagnosis image 21, which is the diagnosis image of interest, obtained by photographing the same subject at a time later than the photographing time of the previous image; an aligning unit 30 for aligning the positions of the subject in two medical images (the previous image and the current diagnosis image in this example); an alignment information storing unit 40 for storing alignment information obtained by the alignment between the previous image 11 and the current diagnosis image 21; an abnormal shadow detecting unit 50 for detecting an abnormal shadow from the vicinity of a predefined position; an abnormal shadow positional information storing unit 60 for storing positional information of the abnormal shadow on the subject in the previous image 11; a corresponding position calculating unit 70 for calculating a position on the subject in the current diagnosis image 21 corresponding to the position of the abnormal shadow on the subject in the previous image 11 based on the positional information of the abnormal shadow in the previous image 11 and the alignment information; and a current diagnosis image abnormal shadow detecting unit 80 for detecting the abnormal shadow from the vicinity of the corresponding position in the current diagnosis image 21 through the use of the abnormal shadow detecting unit 50.

Now, a case where the medical images (the previous image and the current diagnosis image) are multiple tomographic images obtained by photographing the subject with a tomographic apparatus, such as a computerized tomography (CT) apparatus, will specifically be explained in this embodiment.

Medical images taken with a CT apparatus or the like installed at, for example, a department of radiology are stored in an image server (not shown) via a network. The image server stores the medical images in a form complying with DICOM, together with patient information of photographed subjects, photographing dates, modality information, and the like. The image server is configured to function as a database so that a necessary medical image can be searched with various information associated with the medical image.

The image processing apparatus 1 connects to the image server via the network, and retrieves a medical image of a subject to be diagnosed as the current diagnosis image 21 from the images stored in the image server and stores the image in the current diagnosis image storing unit 20. Further, a previously photographed medical image of the subject to be diagnosed is searched, and retrieved from the image server and stored in the previous image storing unit 10 as the previous image 11.

Because of a large exposure dose to the subject during a CT scan, only a site which the doctor wishes to observe in detail is photographed. Therefore, even if the same site of the same subject is to be diagnosed, the current photographed site may not completely correspond to the previously photographed site depending on a photographing time and/or an operator who carried out the photographing.

Therefore, the aligning unit 30 uses an overall reference image 31, which is a gray image containing anatomic structures of an entire human body having standard densities (luminance values) and located at standard positions, to align the previous image 11 and the current diagnosis image 21 with the overall reference image 31 at their corresponding positions, and then the previous image 11 and the current diagnosis image 21 are aligned with each other. In this manner, tomographic images which do not completely correspond to each other can be accurately aligned with each other.

The overall reference image 31 is a gray image containing anatomic structures of the entire subject having standard densities and positions, which are found by calculating mean values of densities and positions of the anatomic structures, such as organs and bones, in tomographic images of a number of human bodies taken with a CT apparatus. Further, positional information of feature points on the gray image, which serve as reference points for alignment, such as points on the shoulder and the rib cage, the apex of lung, the branching point of the bronchial tubes and the contour of the lobes of the lungs, are stored in advance together with the overall reference image 31 (specifically, for example, extraction of the bronchial tubes and extraction of the contour of the lobes of the lungs described in Journal of Institute of Electronics, Information and Communication Engineers D, Vol. J87-D2, No. 1, pp. 357-360, January 2004, can be used).

First, anatomic structures in the previous image 11 stored in the previous image storing unit 10 are aligned with the corresponding anatomic structures in the overall reference image 31.

For example, in a case where a tomographic image of the chest of the subject is aligned, feature points on the shoulder and the rib cage are automatically extracted from the previous image 11, and global alignment between these feature points in the previous image 11 and corresponding feature points in the overall reference image 31 is carried out. Further, since the bones and organs appearing in the image have their characteristic density values, detailed alignment between the corresponding structures are carried out by comparing density information of the overall reference image 31 and the previous image 11.

Figure 2A:
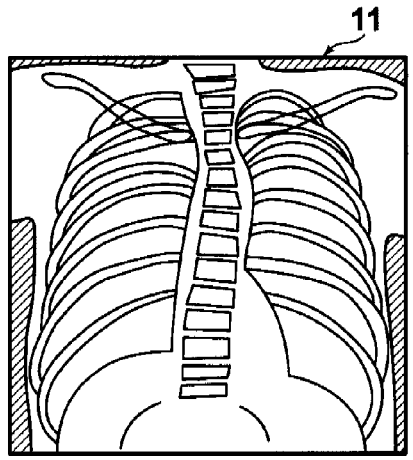
FIGS. 2A and 2B illustrates one example of a previous image and an overall reference image.
Figure 2B:
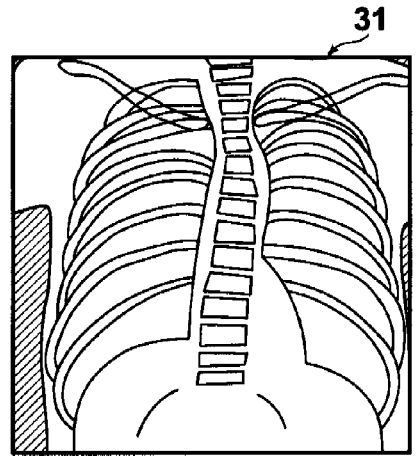
Figure 3A:
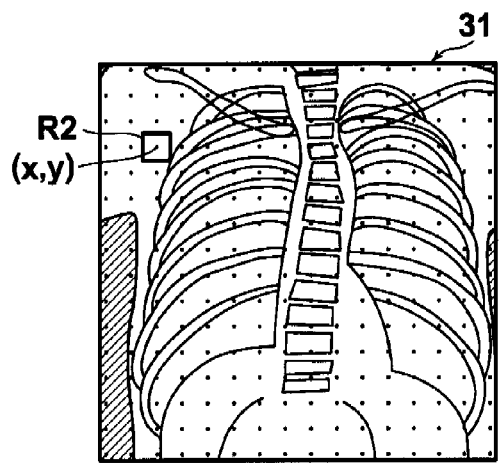
FIGS. 3A and 3B are diagrams for explaining detailed alignment between the previous image and the overall reference image.
Figure 3B:
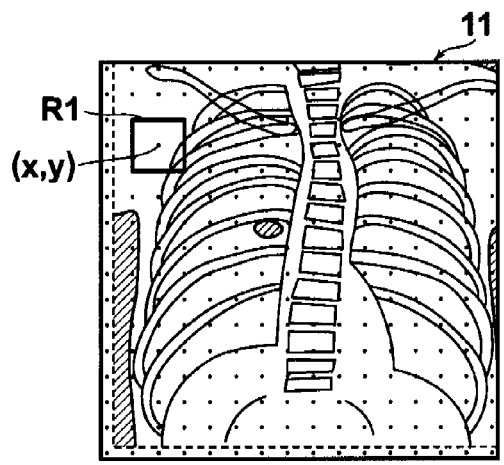

Here, a case where chest images are aligned will be explained using two-dimensional images as shown in FIGS. 2A, 2B, 3A and 3B, for convenience. As shown in FIGS. 2A and 2B, a chest image of the previous image 11 (see FIG. 2A) is globally aligned to the position of the chest in the overall reference image 31 (FIG. 2B shows only the chest part among the body sites contained in the overall reference image). Then, alignment is carried out for a number of local regions obtained by dividing the globally aligned images. Since the previous image 11 usually has information of the photographed site associated therewith, one can learn from this information that the previous image 11 is a chest image. Therefore, feature points representing features of the rib cage are extracted from the rib cage detected in the previous image 11. Based on the extracted feature points and the stored feature points in the overall reference image 31, rough global alignment between the previous image 11 and the overall reference image 31 is carried out through application of affine transformation, such as rotation, translation and scaling, to the previous image 11. Then, the overall reference image 31 is divided into a number of rectangular small regions R2, and search regions R1, which are larger than the rectangular small regions R2, are set in the previous image 11 at corresponding positions. From each search region R1, an area having density information that matches the best the density information of the corresponding rectangular small region R2 is searched. This search is carried out for each rectangular small region R2 of the overall reference image 31 to find corresponding positions between the previous image 11 and the overall reference image 31.

Similarly, corresponding positions between the current diagnosis image 21 and the overall reference image 31 are found. Further, based on the corresponding positions between the previous image 11 and the overall reference image 31 and the corresponding positions between the current diagnosis image 21 and the overall reference image 31, corresponding positions between the previous image 11 and the current diagnosis image 21 are found and they are stored in the alignment information storing unit 40 as the alignment information. Specifically, for example, data representing the corresponding positions between the previous image 11 and the current diagnosis image 21 in shift vectors may be stored.

Although the alignment between two-dimensional images has been described above, corresponding positions can similarly be found between three-dimensional images formed by multiple tomographic images of the chest taken with a CT apparatus, or the like. In this case, three-dimensional feature points of the rib cage, or the like, are detected from the three-dimensional previous image 11 and the current diagnosis image 21. Then, the rib cage in each of the previous image 11 and the current diagnosis image 21 is globally aligned with the overall reference image 31 through affine transformation, or the like. Thereafter, the overall reference image 31 is divided into small regions (cubic regions, for example), and areas where the density information of the small regions of the overall reference image 31 and the density information of the search regions (regions larger than the small regions) set in each of the previous image 11 and the current diagnosis image 21 match the best are searched to find the corresponding positions. Then, shift vectors representing the corresponding positions between the previous image 11 and the current diagnosis image 21 are found as the alignment information and stored in the alignment information storing unit 40.

Although the alignment of the chest images has been specifically described above, alignment of images of other body sites, such as abdomen, can similarly be carried out.

Next, a case where the abnormal shadow detecting unit 50 detects a contour of an abnormal shadow from the vicinity of a predefined position in each tomographic image P of the medical images (the previous image 11 and the current diagnosis image 21), which have been obtained by photographing a tumor with a tomographic apparatus such as a CT apparatus, is explained. In this embodiment, specific explanation is given on a method for determining a contour through the use of an assessment function for assessing whether or not each pixel in the image of interest represents the contour. The assessment function is obtained in advance through learning of feature quantities of pixels in sample tomographic images containing regions of abnormal shadows having known contours.

Figure 4:
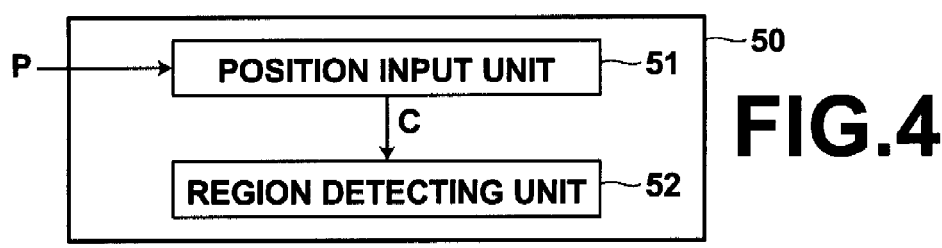
FIG. 4 is a diagram illustrating the configuration of an abnormal shadow detecting unit.

As shown in FIG. 4, the abnormal shadow detecting unit 50 is formed by a position input unit 51 for receiving a given position (point C) in the tomographic image P inputted thereto, and a region detecting unit 52 for detecting the region of the abnormal shadow from the vicinity of the inputted position (point C). In the following explanation, the region of the abnormal shadow is supposed to be a tumor region.

Further, as shown in FIG. 5, the region detecting unit 52 includes: an discrimination area determining unit 53 for determining a discrimination area TT having a sufficient size containing the tumor region from the vicinity of the inputted point C; a coordinate transforming unit 54 for transforming an image of the determined discrimination area TT into an discrimination image PP in polar coordinates with respect to the point C; a multiresolution image obtaining unit 55 for converting the discrimination image PP subjected to the coordinate transformation into multiresolution images RP; a contour obtaining unit 56 for obtaining a contour B of the tumor in each of the multiresolution images RP; an optimal contour selecting unit 57 for selecting an optimal contour BB from the contours B obtained in the multiresolution images RP; and an inverse coordinate transforming unit 58 for inverse-transforming the image in the polar coordinates containing information of the selected optimal contour BB into an image in orthogonal coordinates with respect to the point C.

As shown in FIG. 6, the tomographic image P taken with a CT apparatus, or the like, is displayed on a display device, and the user sets a point ("+" in the drawing) in the tumor region in the displayed tomographic image P via a keyboard, a pointing device, or the like. Then, the position of the set point C is inputted to the position input unit 51.

Alternatively, since it is often the case that the tumor present in the current diagnosis image 21 has been present in the previous image 11 at a position corresponding to the position of the tumor in the current diagnosis image 21, the tumor in the current diagnosis image 21 may be detected from the vicinity of an area corresponding to the tumor region detected in the previous image 11. In this case, the position of the center point C (not shown) of the tumor found from the tumor region in the previous image may be inputted to the position input unit 51. The point C to be inputted may be any point as long as it is a pixel other than pixels representing the contour of the tumor, and the point C may not be a pixel at the center of the tumor.

Figures 7A, 7B, 7C, 7D, 7E:
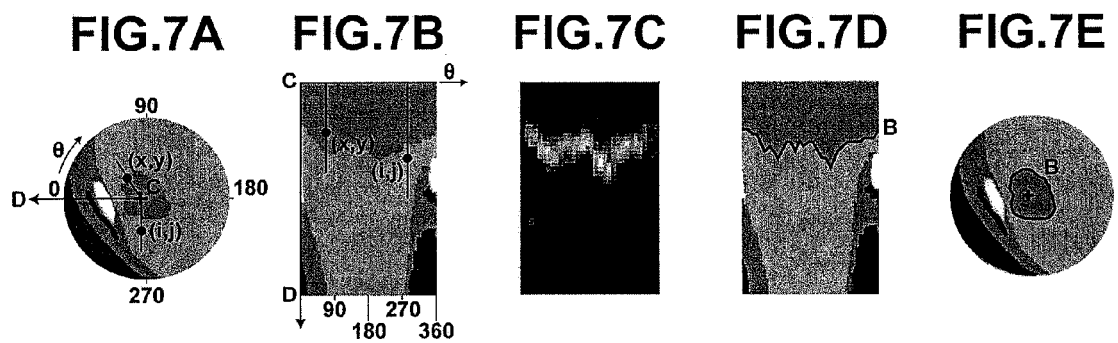
FIGS. 7A-7E are diagrams for explaining how the tumor region is detected according to the present invention.

As shown in FIG. 7A, the discrimination area determining unit 53 determines, as the discrimination area TT, an area having a certain radius, which is sufficient for containing the tumor region, around the point C inputted via the position input unit 51. By limiting the extent of the area of interest in the entire image P, speeding up of the subsequent operations can be achieved.

The coordinate transforming unit 54 transforms the image of the discrimination area TT determined by the discrimination area determining unit 53 into a discrimination image PP in a polar coordinate plane, which is represented by a distance to each point in the image from the center point C and an angle θ formed between a straight line connecting the point and the center point C and a predefined straight line through the center point C. For example, using the image in polar coordinates shown in FIG. 7B, which is obtained by defining the angle θ in the clockwise direction from a line segment CD extending in the radial direction of the image shown in FIG. 7A, pixels in the discrimination area can be searched through simply by translation.

Figure 8:
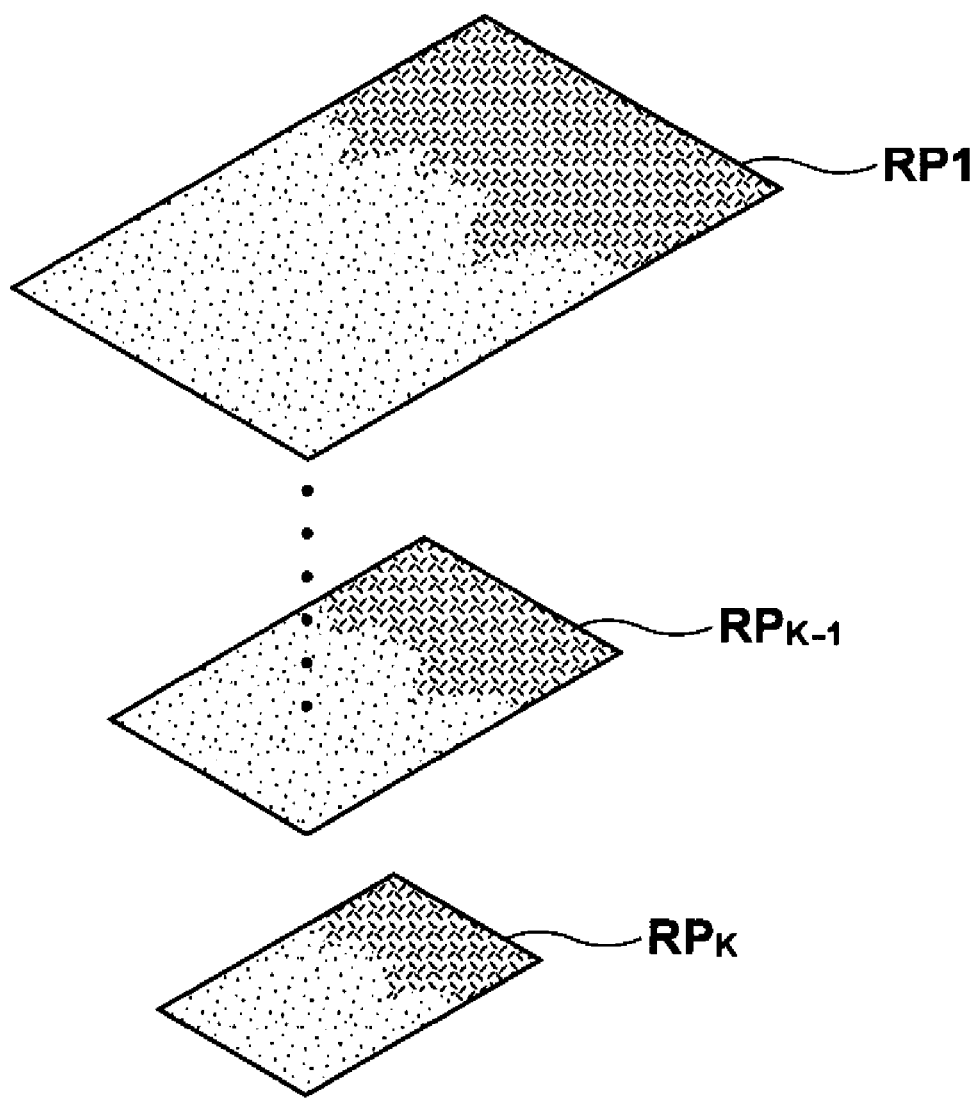
FIG. 8 illustrates one example of multiresolution images.
Figure 9A:
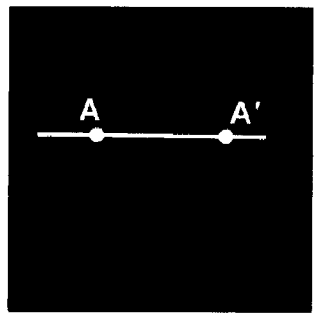
FIGS. 9A-9D illustrate one-dimensional luminance profiles along a straight line crossing a tumor.
Figure 9B:
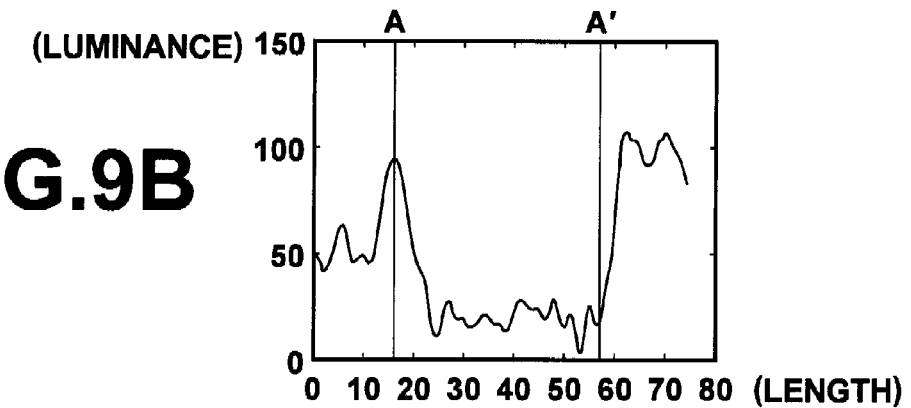
Figure 9C:
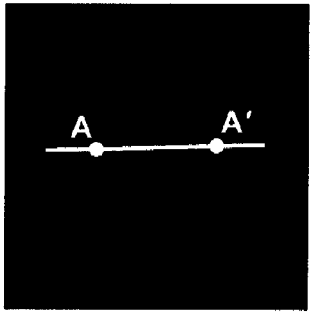
Figure 9D:
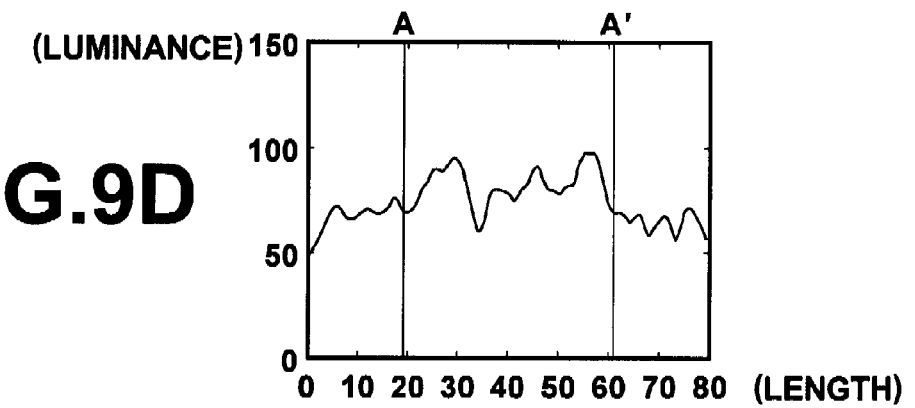

As shown in FIG. 8, the multiresolution image obtaining unit 55 converts the discrimination image PP, which has been obtained through the coordinate transformation, into multiresolution images to generate images $RP_1, \ldots RP_{K-1}$ and $RP_K$ having different resolutions. By changing the resolution of the image of the tumor of interest, the size of the tumor image can be changed, and thus tumors having different sizes can be assessed with the same assessment function F. That is, even if the assessment function is generated so as to assess tumors having sizes within a predefined range, a tumor having a size out of the predefined range can be assessed with the same assessment function by using a lower or higher resolution image of the tumor having a tumor size within the predefined range for the assessment function F. In this manner, contours of tumor regions having various sizes can be reliably detected.

It should be noted that, although the assessment function F used in this embodiment for assessing the multiresolution images of the discrimination image is configured to assess tumors having a certain size, multiple assessment functions may be prepared for assessing tumors having different sizes, so that a contour of a tumor region having a varying size can be detected from a single discrimination image.

As shown in FIG. 5, the contour obtaining unit 56 includes: a feature quantity extracting unit 561 for extracting a feature quantity L from each pixel in the discrimination area TT; an assessment value calculating unit 562 for calculating an assessment value S for each pixel, which indicates whether or not the pixel represents the contour, based on the extracted feature quantity L through the use of the assessment function F; and a contour determining unit 563 for determining the contour B based on the calculated assessment values S.

Now, a method for obtaining the assessment function F for assessing whether or not each pixel in the tomographic image of interest represents the contour will be explained. The assessment function F can be obtained through machine learning using, for example, the Adaboosting Algorithm, in which feature quantities of pixels in sample images (tomographic images in this example) containing tumor regions, whose contours are known, are learned in advance.

Specifically, first, a number of learning samples $(x1,y1), \ldots,$ and $(xN,yN)$ including those labeled as positive samples and those labeled as negative samples are prepared from tomographic images containing tumor regions having known contours. In this example, xi represents learning sample data, i.e., a one-dimensional luminance profile in this embodiment, and yi represents a label of the learning sample, such that yi=1 indicates that the learning sample is a positive sample, and yi=−1 indicates that the learning sample is a negative sample.

As shown in FIGS. 9A-9D, for example, a positive sample is obtained by setting a line (such as line A-A' shown in FIGS. 9A and 9C, for example) that crosses a tumor and has a predefined length containing the contour of the tumor, and extracting a one-dimensional luminance profile (which represents varying luminance values of pixels along the line) that contains two luminance values representing the contour. On the other hand, a one-dimensional luminance profile containing only one luminance value representing the contour, or a one-dimensional luminance profile obtained from pixels along a line that is set within the tumor or on the background tissues and does not contain the contour is extracted as a negative sample. Further, the length of the lines for extracting the one-dimensional luminance profiles may be standardized (for example, to 32 pixels) so that the one-dimensional luminance profiles have the same length.

Figure 10A:
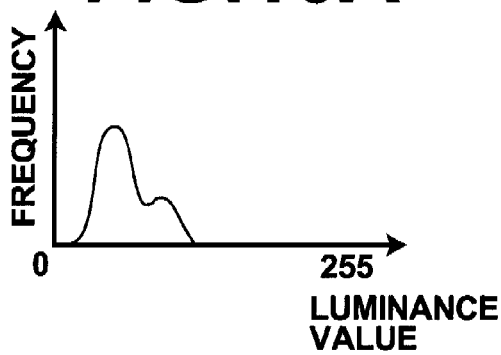
FIGS. 10A-10D are diagrams for explaining normalization of the one-dimensional luminance profile.
Figure 10B:
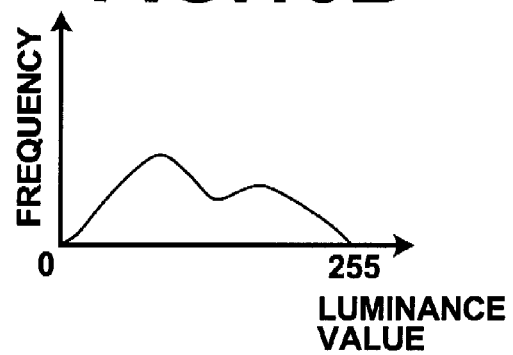

Then, the extracted one-dimensional luminance profiles are normalized so that they have a certain level of contrast. For example, if the distribution of luminance values in a one-dimensional luminance profile is biased toward smaller values as shown in FIG. 10A, then, the luminance values are normalized so that they distribute over the entire range of values from 0 to 255, as shown in FIG. 10B.

Figure 10C:
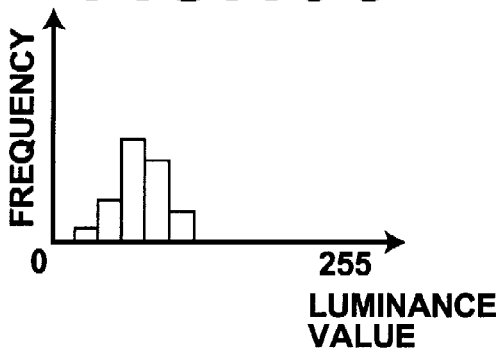
Figure 10D:
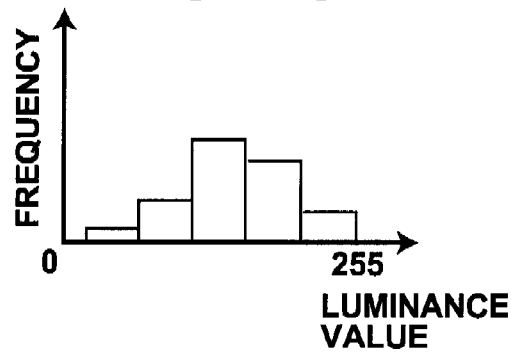

It should be noted that, in order to reduce the amount of information to allow high speed processing, the distribution range of the histogram of the one-dimensional luminance profile may be divided, for example, into five sections, as shown in FIG. 10C, and normalization may be carried out so that the one-dimensional luminance profile is represented by frequencies in five sections obtained by dividing the range of the values from 0 to 255, as shown in the frequency distribution of FIG. 10D.

The assessment function F obtained through Adaboosting is formed by multiple weak classifiers $f_1$-$f_M$ (M is the number of weak classifiers), as shown in FIG. 11. Each of the weak classifiers $f_1$-$f_M$ determines whether or not each learning sample is a positive sample by using the data of the learning sample, i.e., the feature quantity L based on the luminance information of the one-dimensional luminance profile.

Each of the weak classifiers $f_1$-$f_M$ has a histogram, as shown in FIG. 12, and outputs, based on the histogram, a result of determination according to values of the feature quantity L based on the luminance information of the one-dimensional luminance profile.

In this embodiment, the feature quantity L with respect to each pixel is obtained from a combination of luminance values of three pixels in each normalized one-dimensional luminance profile. Each of the weak classifiers $f_1$-$f_M$ carries out classification using a feature quantity obtained from a different combination of three pixels among pixels in each one-dimensional luminance profile. For example, the feature quantity L to be used for classification by the weak classifier $f_1$ may be extracted from a combination of luminance values of three pixels from the left end of each one-dimensional luminance profile, and the feature quantity L to be used for classification by the weak classifier $f_2$ may be extracted from a combination of luminance values of the first, third and fifth pixels from the left end of each one-dimensional luminance profile.

It should be noted that, although each of the weak classifiers $f_1$-$f_M$ uses as the feature quantity the luminance values of a different combination of pixels in the above-described example, the weak classifiers may use other information obtained from the image such as differences between luminance values, contrast, edge, or the like.

Next, how the multiple weak classifiers $f_m$ are sequentially generated according to the Adaboosting algorithm to form the assessment function F will be explained.

A final assessment function $F_M$ determines whether a symbol of a sum of the results of determination by all the weak classifiers for each sample, i.e., the assessment function $F_M$ represented by formula (1) below, is positive or negative to assess whether the sample is a positive sample, i.e., a one-dimensional luminance profile containing two luminance values representing the contour:

$$F(x) = sgn(\Sigma_{m=1}^{M} f_m(x)) \quad (1).$$

It should be noted that, although the assessment function F is obtained through the Adaboosting algorithm in this example, the assessment function may be obtained through other machine learning schemes such as neural network.

Figure 13:
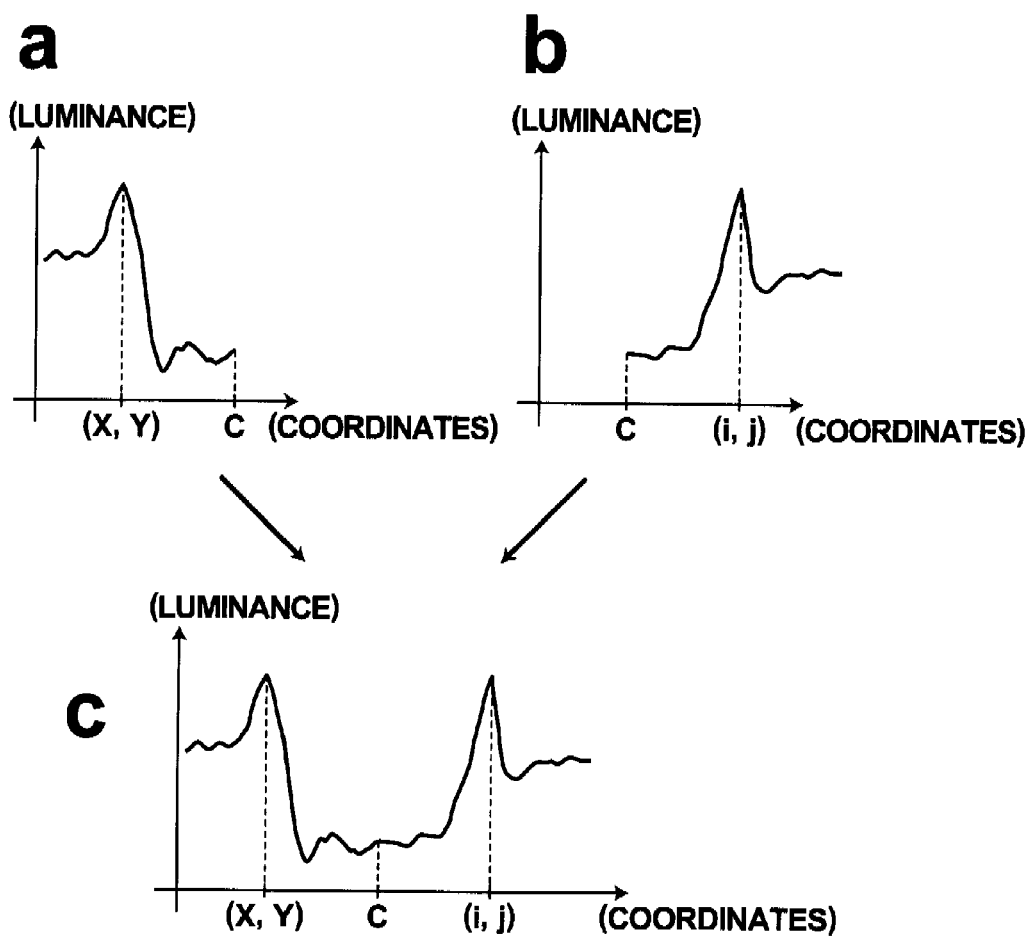
FIG. 13 is a diagram for explaining how the one-dimensional luminance profile is generated.

The feature quantity extracting unit 561 extracts a feature quantity with respect to each pixel in the discrimination images RP. As the feature quantity, a one-dimensional luminance profile p ((x,y), (i,j)) with respect to pixels at coordinates (x,y), (i,j) (see "c" in FIG. 13) is obtained by combining a one-dimensional luminance profile (see "a" in FIG. 13) of pixels along a straight line connecting the center point C and a point at coordinates (x,y) and another one-dimensional luminance profile (see "b" in FIG. 13) of pixels along another straight line through the center point C and a point at coordinates (i,j) extending in a different direction from the former straight line, as shown in FIGS. 7A and 7B (the image of FIG. 7B is obtained by transforming the image of FIG. 7A into polar coordinates).

The length of the obtained one-dimensional luminance profiles, i.e., the number of pixels, is adjusted so as to be assessable by the assessment function F, and further, the normalization and the conversion into five values (as shown in FIGS. 10A to 10D) are carried out. Then, luminance values of a different combination of three pixels in each normalized one-dimensional luminance profile is extracted as the feature quantity L with respect to each pixel at the coordinates (x,y) to be used for classification by each corresponding one of the weak classifiers $f_1$-$f_M$ forming the assessment function F.

The assessment value calculating unit 562 calculates the assessment value S for each pixel, which indicates whether or not each pixel (x,y) in the discrimination area TT represents the contour based on the feature quantity L extracted from the luminance information of the one-dimensional luminance profile with respect to the pixel. Specifically, as shown by formula (2) below, if the sum $\Sigma_{m=1}^{M} f_m$ of the results of determination by the weak classifiers $f_1$-$f_M$ based on the feature quantities L, each formed by luminance values of a different combination of three pixels in the one-dimensional luminance profile p ((x,y), (i,j)), is greater than a set threshold (zero), the sum of the results of determination is obtained as AdaS, and if the sum $\Sigma_{m=1}^{M} f_m$ of the results of determination is equal to or smaller than the threshold, AdaS is set to 0.

$$AdaS((x, y), (i, j)) = \begin{cases} \text{if } \sum_{m=1}^{M} f(p((x, y), (i, j))) > 0, \\ \sum_{m=1}^{M} f(p((x, y), (i, j))) \\ \text{else } 0 \end{cases} \quad (2)$$

The greater the value of AdaS, the higher the probability of the pixels at the coordinates (x,y) and any other coordinates (i,j) being pixels corresponding to the contour of the tumor. AdaS is obtained for the coordinates (x,y) and the other coordinates (i,j) in the image RP, and the assessment value S for the coordinates (x,y) is calculated according to formula (3) below:

$$s(x,y) = \Sigma_{i=1}^{32} \max(AdaS((x,y),(i,j))) \quad (3).$$

i≠x, j=1, . . . , 36

FIG. 7C shows an image in which the assessment values S calculated based on the feature quantities of the pixels in the image are expressed as luminance values of the pixels, where the pixels shown in white have high assessment values and therefore have high probabilities of being the contour.

The contour determining unit 563 finds an optimal contour path through dynamic programming, based on the assessment values S of the pixels calculated by the assessment value calculating unit 562 and determines the path as the contour B of the tumor. The optimal contour path is found as shown by formula (4) below, in which a search range for searching a next pixel from one pixel on the contour is set within two pixels from the one pixel to ensure a certain level of continuity.

$$Su(0, y) = s(0, y) \quad (4)$$
$$Su(x + 1, y) = \max_{-2 \le k \le 2} Su(x, y + k) + s(x + 1, y)$$

Specifically, the optimal contour B is determined, through the use of dynamic programming or the like, by finding an optimal solution for the contour path with repeatedly setting an optimal point (a pixel having the maximum sum) searched from candidate pixels in the search range as a next contour point, to ensure a certain level of continuity. The images shown in FIGS. 7C and 7D illustrate one example of the contour determined by the contour determining unit 563 based on the assessment values S of the pixels in the image.

Then, the optimal contour selecting unit 57 calculates a sum of the assessment values S of pixels on each of contours $B_1$-$B_K$ of the tumor found in the multiresolution images, and selects one of the contours which has the largest value as the optimal contour BB.

The inverse coordinate transforming unit 58 applies inverse transformation with respect to the transformation by the coordinate transforming unit 54, i.e., transforms the image in the polar coordinates with respect to the center point C into an image in orthogonal coordinates with respect to the center point C. By transforming the image in the polar coordinates containing the contour information selected by the optimal contour selecting unit 57 into the image in the orthogonal coordinates with respect to the center point C, the contour B can be displayed on the medical image such as the image of the discrimination area TT, as shown in FIG. 7E.

According to the above-described embodiment, machine learning of the feature quantities of the pixels in the sample images containing tumor regions having known contours is carried out in advance to generate the assessment function F for assessing whether or not each pixel represents the contour based on the feature quantities. Then, the image of the discrimination area TT determined from the point C, which is arbitrarily set in the tumor region in the medical image, is converted into the multiresolution images, and the feature quantities L are extracted from each of the multiresolution images. Subsequently, the assessment value S indicating whether or not each pixel represents the contour is calculated through the use of the assessment function F, and the contour B is determined based on the assessment values S of the pixels. In this manner, accurate determination of the contour can be achieved for tumor regions having various sizes and shapes and complicated density distributions.

The abnormal shadow positional information storing unit 60 stores positional information of the abnormal shadow in the previous image 11. As the positional information of the abnormal shadow, the position of the abnormal shadow detected by the above-described abnormal shadow detecting unit 50 may be stored, or alternatively, the position of the abnormal shadow to be stored may be manually inputted by the user with the input device, such as a pointing device, by drawing a line around the abnormal shadow in the previous image 11.

The corresponding position calculating unit 70 calculates a corresponding position of the abnormal shadow on the subject in the current diagnosis image 21 based on shift vectors between corresponding positions of the current diagnosis image 21 and the previous image 11 stored in the alignment information storing unit 40 and the position of abnormal shadow in the previous image 11 stored in the abnormal shadow positional information storing unit 60.

It is often the case that an abnormal shadow, such as a tumor, in the current diagnosis image 21 has been present in the previous image 11 at a position corresponding to the position of the abnormal shadow in the current diagnosis image 21. Therefore, using the abnormal shadow detecting unit 50, the current diagnosis image abnormal shadow detecting unit 80 detects the abnormal shadow from the vicinity of the corresponding position for the abnormal shadow in the current diagnosis image 21 found by the corresponding position calculating unit 70. Specifically, a tomographic image of the current diagnosis image 21 corresponding to the tomographic image of the previous image 11 containing the abnormal shadow is found, and a position in the tomographic image of the current diagnosis image 21 corresponding to the position of the abnormal shadow in the previous image 11 is calculated, and then the abnormal shadow is detected from the vicinity of the corresponding position in the current diagnosis image 21 by the abnormal shadow detecting unit 50.

Now, referring to flow charts shown in FIGS. 14 and 15, the flow of a process carried out in the image processing apparatus 1 for detecting the abnormal shadow in the current diagnosis image based on the positional information of the abnormal shadow detected in the previous image will be explained.

First, as shown in FIG. 14, the abnormal shadow is detected from the previous image 11 by the abnormal shadow detecting unit 50 to obtain accurate information for observation and diagnosis of the previous image 11 obtained by photographing a subject. For this operation, a tomographic image P of the previous image taken with a CT apparatus or the like is displayed on a display device, and the user specifies a point ("+" in the drawing) within the tumor region in the displayed tomographic image P, as shown in FIG. 6. The position of the specified point C is inputted to the position input unit 51 (S100). Then, the region of the abnormal shadow is detected from the vicinity of the inputted point C by the region detecting unit 52 (S101), and positional information of the detected abnormal shadow is associated with the previous image 11 and is once stored in the image server (S102).

Subsequently, as shown in FIG. 15, for diagnosing the current diagnosis image 21 obtained by photographing the same subject as that in the previous image 11, the abnormal shadow in the current diagnosis image 21 is detected based on the positional information of the abnormal shadow detected in the previous image 11. First, the current diagnosis image 21 is retrieved from the image server and is stored in the current diagnosis image storing unit 20 (S103). Further, the previous image 11 is retrieved from the image server and is stored in the previous image storing unit 10, and the positional information of the abnormal shadow in the previous image is stored in the abnormal shadow positional information storing unit 60 (S104).

Then, the previous image 11 and the current diagnosis image 21 are aligned with each other by the aligning unit 30, and the obtained alignment information is stored in the alignment information storing unit 40 (S105). Based on the positional information of the abnormal shadow stored in the abnormal shadow positional information storing unit 60 and the alignment information stored in the alignment information storing unit 40, the corresponding position calculating unit 70 calculates a position on the subject in the current diagnosis image 21 corresponding to the position of the abnormal shadow on the subject in the previous image 11 (S106).

Then, the point C substantially at the center of the abnormal shadow is found from the corresponding position in the current diagnosis image 21, and the position of the point C is inputted to the position input unit 51 (S107). Then, the region of the abnormal shadow is detected from the vicinity of the point C in the current diagnosis image 21 by the region detecting unit 52 (S108).

Although the position of the abnormal shadow in the previous image is detected by the abnormal shadow detecting unit in the above-described example, the position of the abnormal shadow in the previous image may be manually inputted by the user through the use of an input device such as a pointing device, and the abnormal shadow in the current diagnosis image may be detected based on this positional information of the abnormal shadow.

As explained in detail above, by detecting the abnormal shadow from the vicinity of the position in the current diagnosis image corresponding to the position of the abnormal shadow detected in the previous image, the abnormal shadow in the current diagnosis image can be efficiently detected.

Next, a second embodiment will be explained. In the second embodiment, components having substantially the same configuration as those of the first embodiment are not explained in detail, and detailed explanation will be given only on components different from the first embodiment.

Figure 16:
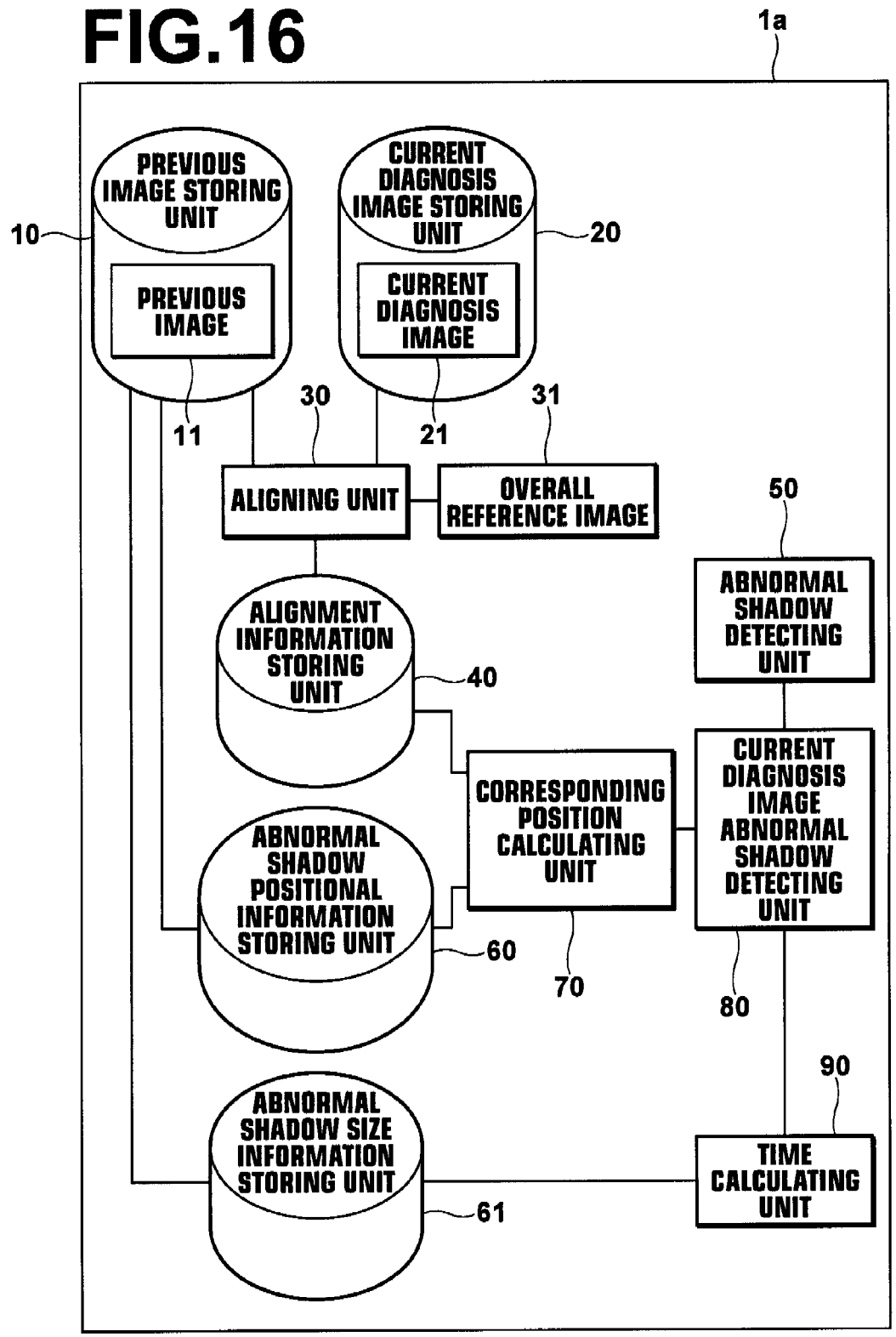
FIG. 16 is a diagram illustrating the schematic configuration of an image processing apparatus according to a second embodiment.

As shown in FIG. 16, an image processing apparatus 1a of this embodiment includes: the previous image storing unit 10 for storing the previous image 11 containing the abnormal shadow obtained by previously photographing the subject; the current diagnosis image storing unit 20 for storing a current diagnosis image 21, which is the diagnosis image of interest, obtained by photographing the same subject at a time later than the photographing time of the previous image; the aligning unit 30 for aligning two medical images (the previous image and the current diagnosis image in this embodiment) with each other; the alignment information storing unit 40 for storing alignment information obtained by the alignment between the previous image 11 and the current diagnosis image 21; the abnormal shadow detecting unit 50 for detecting an abnormal shadow from the vicinity of a predefined position; the abnormal shadow positional information storing unit 60 for storing positional information of the abnormal shadow on the subject in the previous image 11; an abnormal shadow size information storing unit 61 for storing size information representing the size of the abnormal shadow on the subject in the previous image 11; the corresponding position calculating unit 70 for calculating a position on the subject in the current diagnosis image 21 corresponding to the position of the abnormal shadow on the subject in the previous image 11 based on the positional information of the abnormal shadow in the previous image 11 and the alignment information; the current diagnosis image abnormal shadow detecting unit 80 for detecting the abnormal shadow from the vicinity of the corresponding position in the current diagnosis image 21 through the use of the abnormal shadow detecting unit 50; and a time calculating unit 90 for calculating a time over which the size of the abnormal shadow in the previous image 11 has changed to a predefined size based on the size of the abnormal shadow in the previous image 11, the size of the abnormal shadow detected in the current diagnosis image 21, and an interval between the photographing time of the previous image 11 and the photographing time of the current diagnosis image 21.

The abnormal shadow size information storing unit 61 may store the size of the region of the abnormal shadow detected in the previous image 11 by the abnormal shadow detecting unit 50, or may store the size of the abnormal shadow found from an area in the previous image 11 manually specified by the user through the use of an input device such as a pointing device. The size of the abnormal shadow in the previous image 11 is the size of the abnormal shadow present at the position of the abnormal shadow stored in the abnormal shadow positional information storing unit 60.

The time calculating unit 90 calculates a time interval between photographing time and date associated with the previous image 11 and photographing time and date associated with the current diagnosis image 21 stored in the image server, and then calculates a time over which the size of the abnormal shadow is, for example, doubled from the size of the abnormal shadow in the previous image 11, based on the size of the abnormal shadow in the current diagnosis image 21 obtained by the current diagnosis image abnormal shadow detecting unit 80 based on the position of the abnormal shadow stored in the abnormal shadow positional information storing unit 60 and the size of the abnormal shadow in the previous image 11 stored in the abnormal shadow size information storing unit 61.

Now, referring to flow charts shown in FIGS. 17 and 18, the flow of a process carried out in the image processing apparatus 1a of this embodiment for detecting the abnormal shadow in the current diagnosis image based on the position of the abnormal shadow detected in the previous image will be explained.

Figure 17:
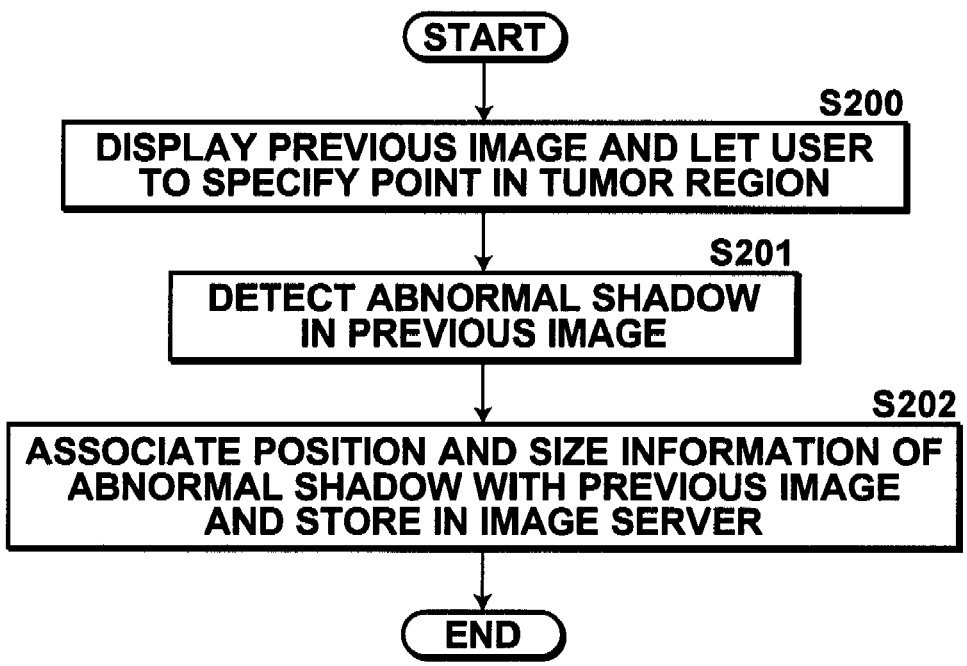
FIG. 17 is a flow chart illustrating the flow of a process carried out in the image processing apparatus of the second embodiment for detecting the abnormal shadow in the current diagnosis image based on the position of the abnormal shadow detected in the previous image (first part)

First, as shown in FIG. 17, an abnormal shadow is detected from the previous image 11 by the abnormal shadow detecting unit 50 to obtain accurate information for observation and diagnosis of the previous image 11 obtained by photographing a subject. For this operation, a tomographic image P of the previous image taken with a CT apparatus or the like is displayed on a display device, and the user specifies a point ("+" in the drawing) within the tumor region in the displayed tomographic image P, as shown in FIG. 6. The position of the specified point C is inputted to the position input unit 51 (S200). Then, the region of the abnormal shadow is detected from the vicinity of the inputted point C by the region detecting unit 52 (S201), and positional information of the detected abnormal shadow is associated with the previous image 11 and is once stored in the image server. At this time, further the size of the region of the abnormal shadow is calculated, and the size information is associated with the previous image 11 and is once stored in the image server (S202).

Figure 18:
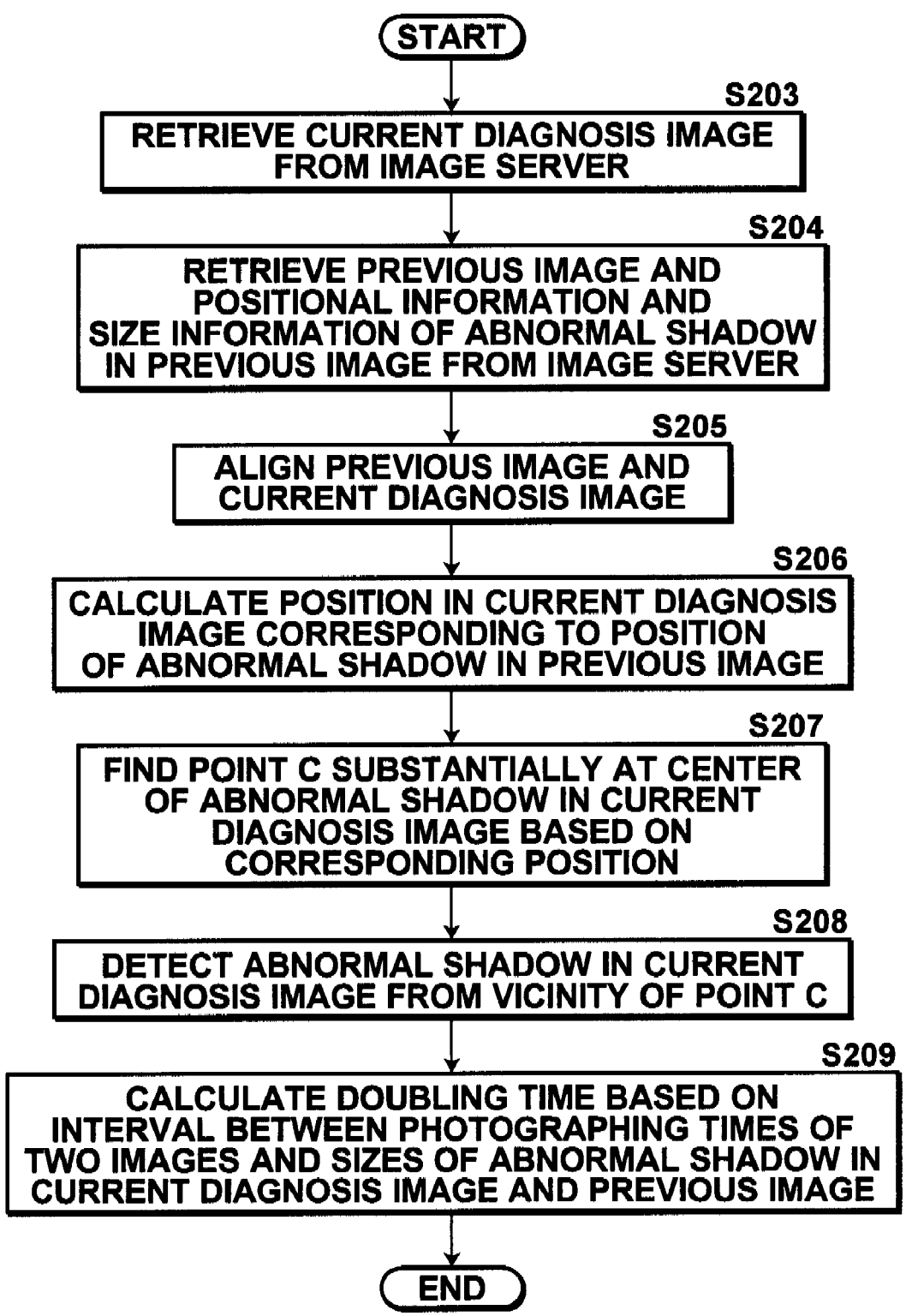
FIG. 18 is a flow chart illustrating the flow of the process carried out in the image processing apparatus of the second embodiment for detecting the abnormal shadow in the current diagnosis image based on the position of the abnormal shadow detected in the previous image (second part)

Subsequently, as shown in FIG. 18, for diagnosing the current diagnosis image 21 obtained by photographing the same subject as that in the previous image 11, the abnormal shadow in the current diagnosis image 21 is detected based on the positional information of the abnormal shadow detected in the previous image 11. First, the current diagnosis image 21 is retrieved from the image server and is stored in the current diagnosis image storing unit 20 (S203). Further, the previous image 11 is retrieved from the image server and is stored in the previous image storing unit 10, and the positional information of the abnormal shadow in the previous image is stored in the abnormal shadow positional information storing unit 60, and the size information of the abnormal shadow is stored in the abnormal shadow size information storing unit 61 (S204).

Then, the previous image 11 and the current diagnosis image 21 are aligned with each other by the aligning unit 30, and the obtained alignment information is stored in the alignment information storing unit 40 (S205). Based on the positional information of the abnormal shadow stored in the abnormal shadow positional information storing unit 60 and the alignment information stored in the alignment information storing unit 40, the corresponding position calculating unit 70 calculates a position on the subject in the current diagnosis image 21 corresponding to the position of the abnormal shadow on the subject in the previous image 11 (S206).

Then, the point C substantially at the center of the abnormal shadow is found from the corresponding position in the current diagnosis image 21, and the position of the point C is inputted to the position input unit 51 (S207). Then, the region of the abnormal shadow is detected from the vicinity of the point C in the current diagnosis image 21 by the region detecting unit 52 (S208).

Further, at the time calculating unit 90, the size of the region of the abnormal shadow detected in the current diagnosis image 21 is obtained, and a time interval between the photographing time and date associated with the previous image 11 and the photographing time and date associated with the current diagnosis image 21 stored in the image server is calculated. Then, a time over which the size of the abnormal shadow at the same position is doubled (doubling time), for example, from the size of the abnormal shadow in the previous image 11 is calculated based on the size of the abnormal shadow in the previous image 11 stored in the abnormal shadow size information storing unit 61, the size of the abnormal shadow in the current diagnosis image 21, the photographing date and time of the previous image and the photographing date and time of the current diagnosis image.

By calculating the time over which the size of the abnormal shadow is doubled, as explained in detail above, an advancing speed and the like of the abnormal shadow can be calculated for helping the diagnosis.

Although the previous image in the above description includes only a previous image taken last time, the previous image may include many previous images taken at different times, and the sizes of the abnormal shadow in the previous images may be obtained and presented in a graph showing changes in the size of the abnormal shadow.

Figure 19:
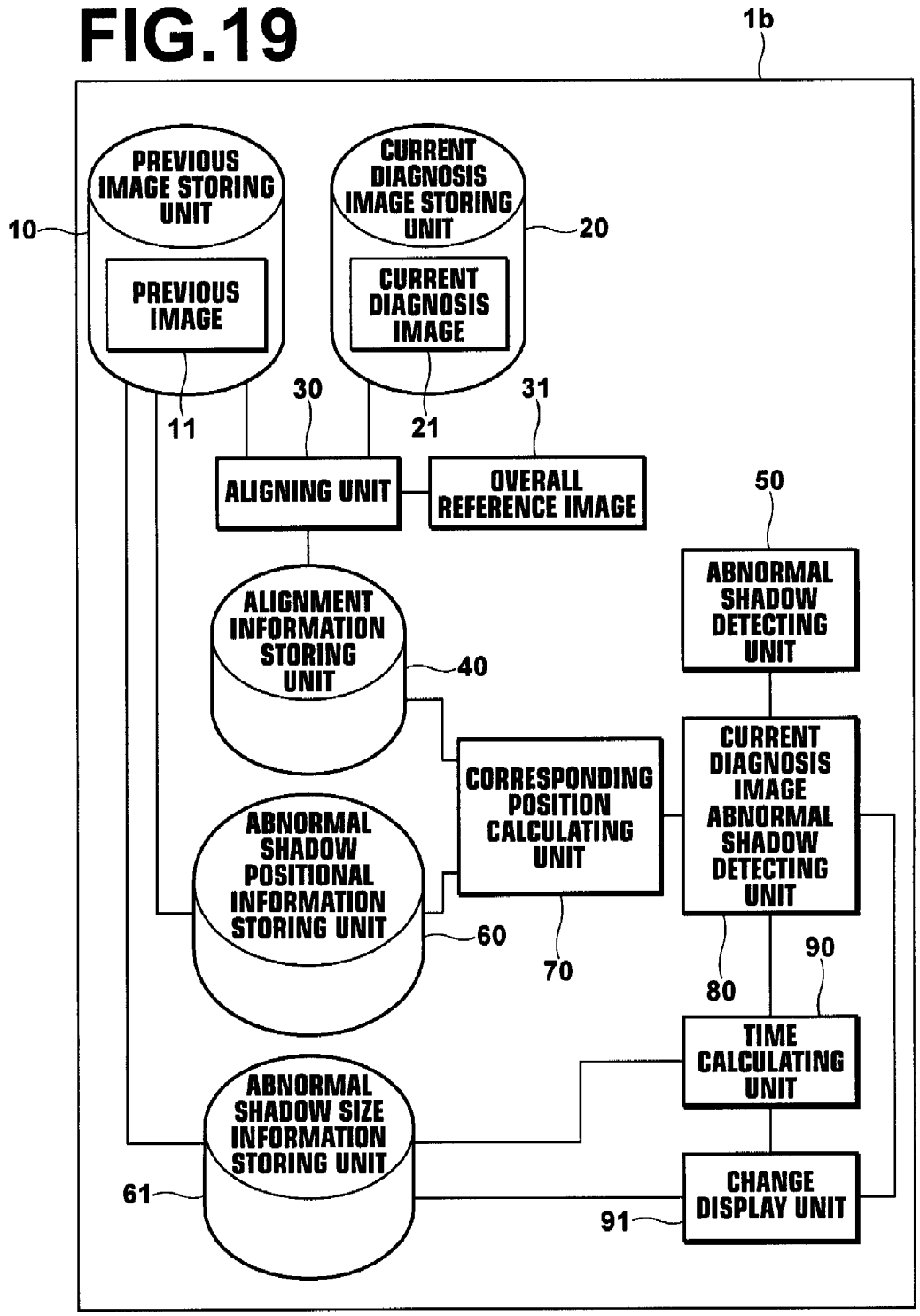
FIG. 19 is a diagram illustrating the schematic configuration of an image processing apparatus according to a third embodiment.

Further, as in an image processing apparatus 1b of a third embodiment shown in FIG. 19, a change displaying unit 91 may be included in addition to the components of the image processing apparatus 1a of the second embodiment. The change displaying unit 91 displays size change information indicating whether the size of the abnormal shadow has increased or decreased based on the size of the abnormal shadow in the previous image and the size of the abnormal shadow detected in the current diagnosis image.

Specifically, this information may be indicated, for example, by displaying a text "INCREASED" or "DECREASED" on a display device according to the change in the size of the abnormal shadow, by displaying a numerical value corresponding to the change in the size, or by displaying the contours of the abnormal shadow in the previous image and the current diagnosis image together so that the change in the size can be seen.

Allowing the user to readily learn the change in the size of the abnormal shadow in this manner is helpful for observation and diagnosis of the abnormal shadow.

Although the CT images are used in the above-described embodiments, other type of images such as MRI images can also be used in the similar manner.

Further, although the alignment between the previous image and the current diagnosis image is carried out through the use of the overall reference image containing anatomic structures of an entire human body having standard densities in the above explanation, the alignment can be carried out using other techniques including, for example, a technique disclosed in Japanese Unexamined Patent Publication No. 8 (1996)-131403 where at least three feature points are extracted from each of two three-dimensional images for aligning them with each other, a technique disclosed in Japanese Unexamined Patent Publication No. 10 (1998)-137231 where relative positional relationship between pieces of image information which are selected based on anatomic shape information is calculated for alignment, a technique disclosed in Japanese Unexamined Patent Publication No. 2000-185036 where certain body sites such as organs are extracted for alignment, a technique disclosed in Japanese Unexamined Patent Publication No. 8 (1996)-294485 where cut planes sliced at substantially the same anatomic positions are found from three-dimensional images for aligning them with each other, and a technique disclosed in Japanese Unexamined Patent Publication No. 2005-124895 where characteristic sites such as the trachea and the bronchial tubes are extracted for aligning tomographic images with each other.

According to the present invention, the abnormal shadow in the current diagnosis image is detected from the vicinity of a position in the current diagnosis image corresponding to the position of the abnormal shadow on the subject in the previous image. In this manner, accuracy in detection of the abnormal shadow can be improved, and a change of the abnormal shadow from the state thereof in the previous image can be observed more easily.

Further, by calculating a time over which the size of the abnormal shadow has changed, an advancing speed of the abnormal shadow can be learned, and this is helpful for diagnosis.

Moreover, by displaying information indicating a change in the size of the abnormal shadow, the change in the size can be recognized at a glance, and this is also helpful for diagnosis.

What is claimed is:

1. An image processing apparatus comprising:
previous image storing means for storing a previous image containing a first abnormal shadow obtained by photographing a subject;
current diagnosis image storing means for storing a current diagnosis image to be diagnosed obtained by photographing the subject at a time later than the photographing time of the previous image;
aligning means for aligning the positions of the subject contained in the previous image and the current diagnosis image;
alignment information storing means for storing alignment information obtained by the aligning means;
abnormal shadow positional information storing means for storing positional information of the first abnormal shadow on the subject in the previous image;
corresponding position calculating means for calculating, based on the positional information of the first abnormal shadow and the alignment information, a corresponding position on the subject in the current diagnosis image, the corresponding position corresponding to the position of the first abnormal shadow on the subject in the previous image; and
current diagnosis image abnormal shadow detecting means for detecting a second abnormal shadow in a judgment region within the current diagnosis image that includes a point within the corresponding position, is of a predetermined range that sufficiently includes the first abnormal shadow, and is designated as the sole detection target region for the second abnormal shadow in the current diagnosis image;
the current diagnosis image abnormal shadow detecting means detecting the second abnormal shadow by searching for the outline of the second abnormal shadow along lines that connect the point within the corresponding position and other points within the judgment region.

2. The image processing apparatus as claimed in claim 1, further comprising time calculating means for calculating a time over which the size of the first abnormal shadow has changed from the size thereof in the previous image to a predefined size, based on the size of the first abnormal shadow in the previous image, the size of the second abnormal shadow detected in the current diagnosis image, and an interval between the photographing time of the previous image and the photographing time of the current diagnosis image.

3. The image processing apparatus as claimed in claim 1, further comprising change displaying means for displaying size change information indicating whether the size of the first abnormal shadow has increased or decreased, based on the size of the first abnormal shadow in the previous image and the size of the second abnormal shadow detected in the current diagnosis image.

4. A non-transitory computer readable media containing a program for causing a computer to function as:
previous image storing means for storing a previous image containing a first abnormal shadow obtained by photographing a subject;

current diagnosis image storing means for storing a current diagnosis image to be diagnosed obtained by photographing the subject at a time later than the photographing time of the previous image;

aligning means for aligning the positions of the subject contained in the previous image and the current diagnosis image;

alignment information storing means for storing alignment information obtained by the aligning means;

abnormal shadow positional information storing means for storing positional information of the first abnormal shadow on the subject in the previous image;

corresponding position calculating means for calculating, based on the positional information of the first abnormal shadow and the alignment information, a corresponding position on the subject in the current diagnosis image, the corresponding position corresponding to the position of the first abnormal shadow on the subject in the previous image; and current diagnosis image abnormal shadow detecting means for detecting a second abnormal shadow in a judgment region within the current diagnosis image that includes a point within the corresponding position, is of a predetermined range that sufficiently includes the first abnormal shadow, and is designated as the sole detection target region for the second abnormal shadow in the current diagnosis image;

the current diagnosis image abnormal shadow detecting means detecting the second abnormal shadow by searching for the outline of the second abnormal shadow along lines that connect the point within the corresponding position and other points within the judgment region.

\* \* \* \* \*